R. De LEIDI.
Propulsion of Cars.

No. 135,972. Patented Feb. 18, 1873.

Witnesses:
A. Bennerkendorf
C. Sedgwick

Inventor:
R. De Leidi

Attorneys.

UNITED STATES PATENT OFFICE.

RAPHAEL DE LEIDI, OF BROOKLYN, NEW YORK.

IMPROVEMENT IN PROPULSION OF CARS.

Specification forming part of Letters Patent No. 135,972, dated February 18, 1873.

Figure 1:
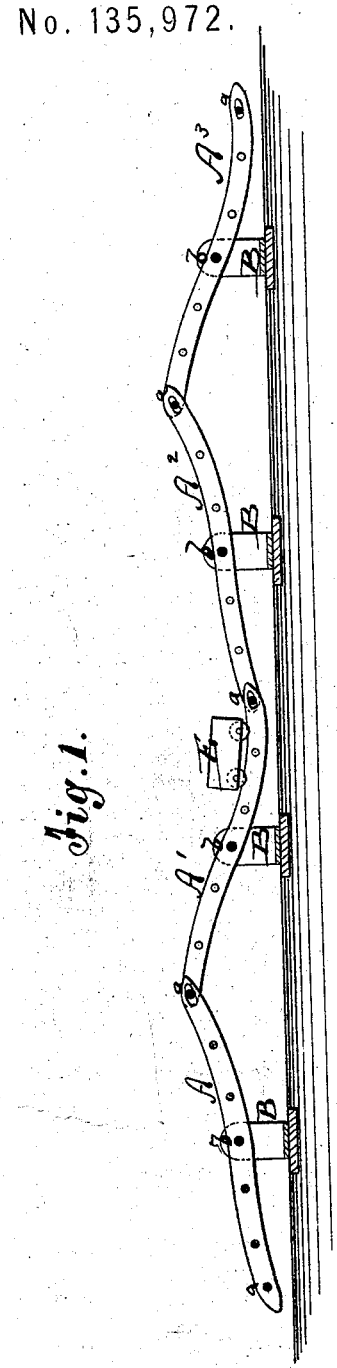
Figure 2:
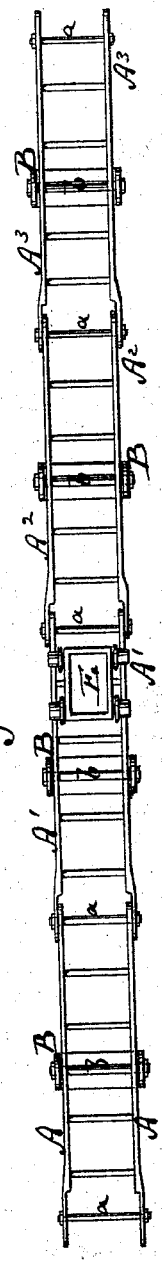
Figure 3:
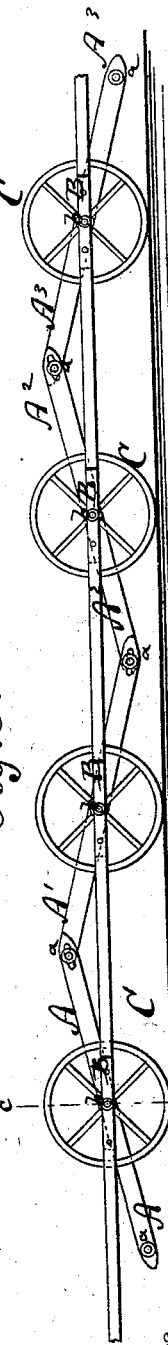
Figure 5:
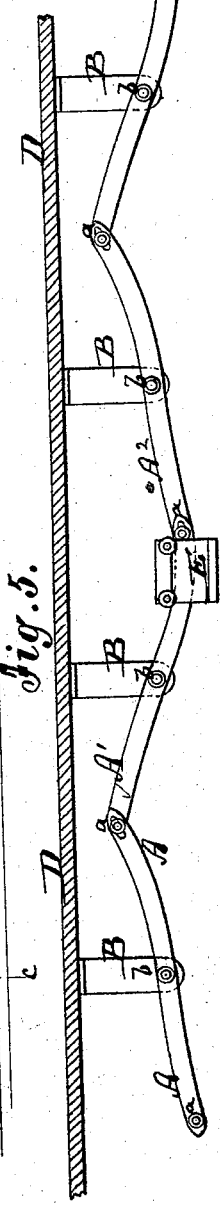
Figure 4:
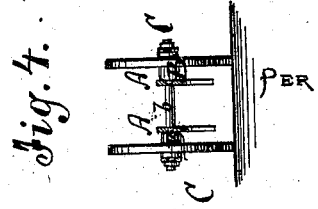

To all whom it may concern:

Be it known that I, RAPHAEL DE LEIDI, of Brooklyn, in the county of Kings and State of New York, have invented a new and improved System of Transmission and Propulsion, of which the following is a specification:

Figure 1 is a sectional side view of a series of my improved jointed rails arranged on stationary supports. Fig. 2 is a top view thereof. Fig. 3 is a side view of the invention, showing it applied to movable supports. Fig. 4 is a vertical transverse section of the same on the line $c$ $c$, Fig. 3. Fig. 5 is a sectional side view of the invention, showing it suspended for aerial transportation.

Similar letters of reference indicate corresponding parts.

This invention relates to a new arrangement of means for propelling vehicles or loads of any kind in either direction over a given track; and consists in making the track of jointed sections, which are pivoted to supports in such manner that, by alternately inclining the several sections in opposite directions, the load supported on the track will be caused to roll from one section to the other until it arrives at its destination.

In the accompanying drawing, the letters A $A^1$ $A^2$ $A^3$, &c., represent sections of one rail, connected at their contiguous ends by pivots $a$ $a$. Each of these sections is at its middle pivoted, by a pin, $b$, to a support, B. The supports B may either be stationary on the ground or otherwise held secure and immovable under the rail, as in Fig. 1; or they may form part of a vehicle, C, that is supported on wheels, as in Figs. 3 and 4; or they may be suspended from the under side of a beam, D, or other superstructure, as in Fig. 5. Two or more such jointed rails, having their several pivots $a$ $a$ and $b$ $b$ in line transversely, constitute one track for the support of a car, E, or other load to be moved. The car or load, when on one of the sections A $A^1$, &c., rolls down toward the lower end thereof, its momentum carrying it over the joint upon the next connecting section. Just after the car or load has passed the joint, and while it is ascending by virtue of its momentum, the sections are swung on their pivots $b$, so that their inclinations will be reversed. This will carry the end of the section on which the car rests to the top, and cause the car to roll forward toward the then lower end of the same section, and thus reach the section beyond, and so on. The requisite vibratory motion is applied to the sections A $A^1$, &c., at one end of the track by an attendant or by machinery. When the track is supported upon a vehicle, C, the apparatus can be used for transporting packages, &c., between any desired two localities.

When the track is suspended the transportation will be aerial and out of the way. Supported, as in Fig. 1, it will be most convenient to apply.

Having thus described my invention, I claim as new and desire to secure by Letters Patent—

The sections A $A^1$ $A^2$, &c., pivoted to fixed, movable, or pendent supports B, and joined together to constitute a flexible track for the propulsion of vehicles, as set forth.

RAPHAEL DE LEIDI.

Witnesses:
T. B. MOSHER,
C. SEDGWICK.